United States Patent
Fanello et al.

(10) Patent No.: US 12,475,638 B2
(45) Date of Patent: Nov. 18, 2025

(54) VOLUMETRIC PERFORMANCE CAPTURE WITH NEURAL RENDERING

(71) Applicant: GOOGLE LLC, Mountain View, CA (US)

(72) Inventors: Sean Ryan Francesco Fanello, San Francisco, CA (US); Abhi Meka, Redwood City, CA (US); Rohit Kumar Pandey, Mountain View, CA (US); Christian Haene, Berkeley, CA (US); Sergio Orts Escolano, San Francisco, CA (US); Christoph Rhemann, Marina Del Rey, CA (US); Paul Debevec, Culver City, CA (US); Sofien Bouaziz, Los Gatos, CA (US); Thabo Beeler, Zurich (CH); Ryan Overbeck, San Francisco, CA (US); Peter Barnum, Mountain View, CA (US); Daniel Erickson, San Francisco, CA (US); Philip Davidson, Arlington, MA (US); Yinda Zhang, Palo Alto, CA (US); Jonathan Taylor, New York, NY (US); Chloe LeGENDRE, Culver City, CA (US); Shahram Izadi, San Francisco, CA (US)

(73) Assignee: Google LLC, Mountain View, CA (US)

( * ) Notice: Subject to any disclaimer, the term of this patent is extended or adjusted under 35 U.S.C. 154(b) by 320 days.

(21) Appl. No.: 18/251,743

(22) PCT Filed: Nov. 5, 2020

(86) PCT No.: PCT/US2020/059067
§ 371 (c)(1),
(2) Date: May 4, 2023

(87) PCT Pub. No.: WO2022/098358
PCT Pub. Date: May 12, 2022

(65) Prior Publication Data
US 2023/0419600 A1    Dec. 28, 2023

(51) Int. Cl.
*G06T 15/50* (2011.01)
*G06T 7/55* (2017.01)
(Continued)

(52) U.S. Cl.
CPC .............. *G06T 15/506* (2013.01); *G06T 7/55* (2017.01); *G06T 7/60* (2013.01); *G06T 15/04* (2013.01);
(Continued)

(58) Field of Classification Search
None
See application file for complete search history.

(56) References Cited

U.S. PATENT DOCUMENTS

2021/0012561 A1\*    1/2021   Sunkavalli ................ G06T 7/55

OTHER PUBLICATIONS

The International Search Report (ISR) with Written Opinion for PCT/US2020/059067 dated Aug. 5, 2021, pp. 1-15.
(Continued)

*Primary Examiner* — Edward Martello
(74) *Attorney, Agent, or Firm* — McDonnell Boehnen Hulbert & Berghoff LLP

(57) ABSTRACT

Example embodiments relate to techniques for volumetric performance capture with neural rendering. A technique may involve initially obtaining images that depict a subject from multiple viewpoints and under various lighting conditions using a light stage and depth data corresponding to the subject using infrared cameras. A neural network may extract features of the subject from the images based on the depth data and map the features into a texture space (e.g., the UV texture space). A neural renderer can be used to generate an output image depicting the subject from a target view
(Continued)

such that illumination of the subject in the output image aligns with the target view. The neural render may resample the features of the subject from the texture space to an image space to generate the output image.

20 Claims, 11 Drawing Sheets

(51) Int. Cl.
  *G06T 7/60* (2017.01)
  *G06T 15/04* (2011.01)
  *G06T 15/20* (2011.01)
(52) U.S. Cl.
  CPC .... *G06T 15/20* (2013.01); *G06T 2207/10048* (2013.01); *G06T 2207/10152* (2013.01); *G06T 2207/20084* (2013.01); *G06T 2207/30196* (2013.01)

(56) References Cited

OTHER PUBLICATIONS

Zhang, Xiuming et al. "Neural Light Transport for Relighting and View Synthesis" Article (2020) vol. 1(1), pp. 1-16. arXiv.org, XP055764816.

Guo, Kaiwen et al. "The relightables: Volumetric Performance Capture of Humans with Realistic Relighting", ACM Transactions on Graphics (2019) vol. 38(6), pp. 1-19, XP058445496.

Meka, Abhimitra et al. "Deep reflectance fields" ACM Transactions on Graphics (2019) vol. 38(4), pp. 1-12, XP058452141.

Jaderberg, Max et al. "Spatial Transformer Networks" arxiv .org (2016), pp. 1-15, XP055549686.

Tewari, Ayush et al. "State of the Art on Neural Rendering" arxiv.org. (2020) vol. 201, XP081640091.

\* cited by examiner

VOLUMETRIC PERFORMANCE CAPTURE WITH NEURAL RENDERING

CROSS REFERENCE TO RELATED APPLICATION

This application is a U.S. National Phase of International Application No. PCT/US2020/059067, filed Nov. 5, 2020, which is incorporated by reference herein in its entirety.

BACKGROUND

Many modern computing devices, including mobile phones, personal computers, and tablets, include image capture devices, such as still and/or video cameras. The image capture devices can capture images of people, animals, landscapes, and/or other objects.

Some image capture devices and/or computing devices can correct or otherwise modify captured images. For example, some image capture devices can provide "red-eye" correction that removes red-appearing eyes of people and animals that may be present in images captured using bright lights, such as flash lighting. After a captured image has been corrected, the corrected image can be saved, displayed, transmitted, printed to paper, and/or otherwise utilized. In some cases, an image of an object may suffer from poor lighting during image capture.

SUMMARY

Disclosed herein are techniques that can be used to develop deep relightable textures that can enable the digital relighting and free-viewpoint rendering of a three-dimensional (3D) subject (e.g., a person) captured in one or more images.

In one aspect, the present application describes a method. The method involves obtaining, using a camera system and a light stage having a plurality of lights, a plurality of images that depict a subject from a plurality of viewpoints and under a plurality of lighting conditions. The method also involves obtaining, using a plurality of infrared cameras, depth data corresponding to the subject. The method further involves extracting, using a neural network, a plurality of features of the subject from the plurality of images based on the depth data corresponding to the subject, and mapping, using the neural network, the plurality of features of the subject into a texture space. The method also involves generating, using a neural renderer, an output image depicting the subject from a target view such that illumination of the subject in the output image aligns with the target view. The neural renderer is configured to resample the features of the subject from the texture space to an image space to generate the output image.

In another aspect, the present application describes a system. The system includes a camera system having a plurality of infrared cameras, a light stage having a plurality of lights, and a computing device. The computing device is configured to obtain, using the camera system and the light stage having the plurality of lights, a plurality of images that depict a subject from a plurality of viewpoints and under a plurality of lighting conditions. The computing device is also configured to obtain, using the plurality of infrared cameras, depth data corresponding to the subject. The computing device is further configured to, based on the depth data corresponding to the subject, extract, using a neural network, a plurality of features of the subject from the plurality of images. The computing device also is configured to map, using the neural network, the plurality of features of the subject into a texture space, and generate, using a neural renderer, an output image depicting the subject from a target view such that illumination of the subject in the output image aligns with the target view. The neural renderer is configured to resample the features of the subject from the texture space to an image space to generate the output image.

In yet another example, the present application describes a non-transitory computer-readable medium configured to store instructions, that when executed by a computing system comprising one or more processors, causes the computing system to perform operations. The operations involve obtaining, using a camera system and a light stage having a plurality of lights, a plurality of images that depict a subject from a plurality of viewpoints and under a plurality of lighting conditions. The operations also involve obtaining, using a plurality of infrared cameras, depth data corresponding to the subject and extracting, using a neural network, a plurality of features of the subject from the plurality of images based on the depth data corresponding to the subject. The operations also involve mapping, using the neural network, the plurality of features of the subject into a texture space and generating, using a neural renderer, an output image depicting the subject from a target view such that illumination of the subject in the output image aligns with the target view. The neural renderer is configured to resample the features of the subject from the texture space to an image space to generate the output image.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
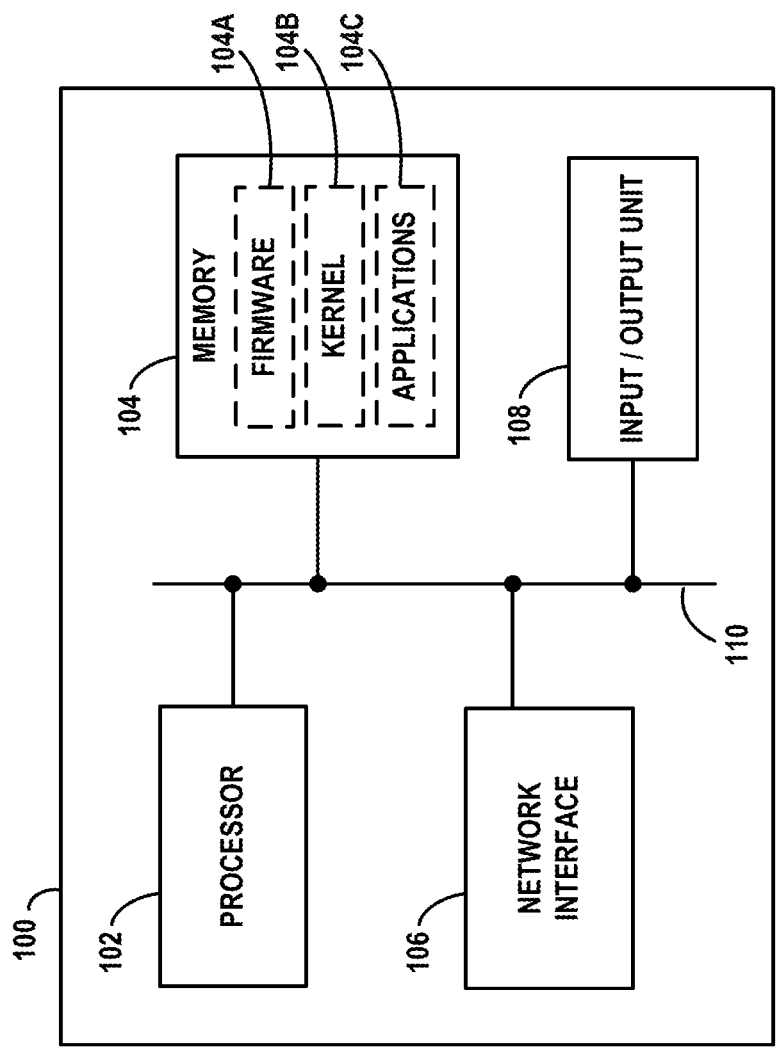
FIG. 1 illustrates a schematic drawing of a computing device, in accordance with example embodiments.

Example methods, devices, and systems are described herein. It should be understood that the words "example"

and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Various applications involve rendering objects from multiple viewpoints with different lighting. In some cases, a person may be the subject that a system aims to render and display from different viewpoints. For instance, augmented and virtual reality, movie production, and game development are some example applications that often use computer graphics and computer vision to attempt to render people from controllable viewpoints with appropriate lighting.

Rendering a person in a photorealistic position can depend on the acquisition of three-dimensional (3D) data of the person. In particular, the generation of an accurate 3D volumetric model of a dynamic performer (e.g., person in motion) can enable computing devices to subsequently render the performer from any arbitrary viewpoint. For instance, a user of a computing device may use the 3D volumetric model developed for a performer to render the performer from one or more target viewpoints on a display interference, such as from a perspective in front of the person, from a perspective above the person, and/or from a perspective behind the person, among other possible perspectives.

In order to render the person realistically, the illumination applied to the subject at the different perspectives should be accurate. For a rendering system to believably composite the model of a person into a novel environment (e.g., a particular setting for a movie scene), the system should be able to apply local lighting of the environment to the model as appropriate to cause the model to appear to be actually present within the environment. Some existing systems attempt to render a person in photorealistic positions using a parameterized mesh that has a restricted resolution and detailing with a fixed lighting condition. This technique, however, can make lighting adjustments difficult and decrease how realistic the person actually appears in renderings. Other existing systems use template-based reconstruction of relightable 3D videos, which similarly suffer accurate rendering reliability due to parametric reflectance models and the use of mesh templates.

An image-based relighting system can be used to capture additional data that may be used to avoid some of the rendering issues described above. The image-based relighting system may have one or more cameras that can be used to capture 2D images of a subject under different illuminations, which can enable the construction of a complete reflectance field of the subject. Image-based relighting systems, however, typically do not acquire the full 3D shape of a subject and often require considerable post-processing and manual touch ups. As a result, image-based relighting systems are often only used for specialized applications.

Example embodiments presented herein involve techniques for volumetric performance capture with neural rendering that can overcome the drawbacks discussed above with respect to existing systems. In particular, the techniques described herein can enable a system to render a person in arbitrary clothing in different poses and from any viewpoint with scene appropriate lighting. By using a Light stage in combination with traditional reflectance and geometry capture pipelines, techniques may use neural networks to learn and subsequently produce nearly photorealistic renderings of performers from any viewpoint and under any desired illumination condition.

To further illustrate an example technique, a system may initially build neural textures in near-real time by extracting features from multi-view imagery, such as images depicting a subject from different viewpoints and under different lighting conditions. The system may be configured to pool the extracted features into a common texture space parameterization (UV parameterization) based on a coarse geometry estimate. For example, a convolution neural network can be used by the system to extract the features and subsequently pool the features in the common texture space. The pooled features can encode both local and global geometric properties and four-dimension (4D) reflectance. The system may then re-project the features to the image space based on a desired viewpoint (e.g., a target viewpoint selected by a user), which can be subsequently evaluated and refined by a neural renderer along with the application of a desired lighting direction to correct any imperfections that might arise due to the coarse geometry. By performing the technique, the system can subsequently synthesize images (e.g., video) of the person with appropriate lighting within different environments without any manual intervention required to correct potential errors or increase accuracy.

Various types of devices may perform the techniques described herein to develop a volumetric capture framework of a subject that a neural renderer can use to synthesize photorealistic views of the subject from arbitrary viewpoints under desired illumination conditions. For example, computing devices, mobile devices, wearable devices, and/or other types of processing units may perform operations related to the techniques described herein. In some examples, a computing device may build neural textures based on multi-view images (e.g., multiple images from various viewpoints) and use these neural textures to render the full reflectance field for unseen dynamic performances of a person that includes occlusion shadows and an alpha compositing mask.

As such, example techniques for rendering photorealistic displays of a subject may involve a framework that combines geometric pipelines with neural rendering, which can enable simultaneous disentanglement of appearance, viewpoint, and lighting. The techniques can enable a computing device to produce and display nearly photorealistic renderings of dynamic performers from arbitrary viewpoints with any desired illumination condition in a manner that can be scaled and does not require manual intervention. This differs from existing systems, which typically require re-training for each new UV parameterization.

I. Example Computing Devices and Cloud-Based Computing Environments

The following embodiments describe architectural and operational aspects of example computing devices and systems that may employ the disclosed ANN implementations, as well as the features and advantages thereof.

FIG. 1 is a simplified block diagram exemplifying a computing system 100, illustrating some of the components that could be included in a computing device arranged to operate in accordance with the embodiments herein. Computing system 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing system 100 includes processor 102, memory 104, network interface 106, and an input/output unit 108, all of which may be coupled by a system bus 110 or a similar mechanism. In some embodiments, computing system 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory. This may include flash memory, hard disk drives, solid state drives, re-writable compact discs (CDs), re-writable digital video discs (DVDs), and/or tape storage, as just a few examples.

Computing system 100 may include fixed memory as well as one or more removable memory units, the latter including but not limited to various types of secure digital (SD) cards. Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing system 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing system 100. Applications 104C may be one or more user-space software programs, such as web browsers or email clients, as well as any software libraries used by these programs. In some examples, applications 104C may include one or more neural network applications. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing system 100 may include Ethernet, BLUETOOTH®, and Wifi interfaces.

Input/output unit 108 may facilitate user and peripheral device interaction with computing system 100 and/or other computing systems. Input/output unit 108 may include one or more types of input devices, such as a keyboard, a mouse, one or more touch screens, sensors, biometric sensors, and so on. Similarly, input/output unit 108 may include one or more types of output devices, such as a screen, monitor, printer, and/or one or more light emitting diodes (LEDs). Additionally or alternatively, computing system 100 may communicate with other devices using a universal serial bus (USB) or high-definition multimedia interface (HDMI) port interface, for example.

In some embodiments, one or more instances of computing system 100 may be deployed to support a clustered architecture. The exact physical location, connectivity, and configuration of these computing devices may be unknown and/or unimportant to client devices. Accordingly, the computing devices may be referred to as "cloud-based" devices that may be housed at various remote data center locations. In addition, computing system 100 may enable performance of embodiments described herein, including using neural networks and implementing techniques for volumetric performance capture with neural rendering.

Figure 2:
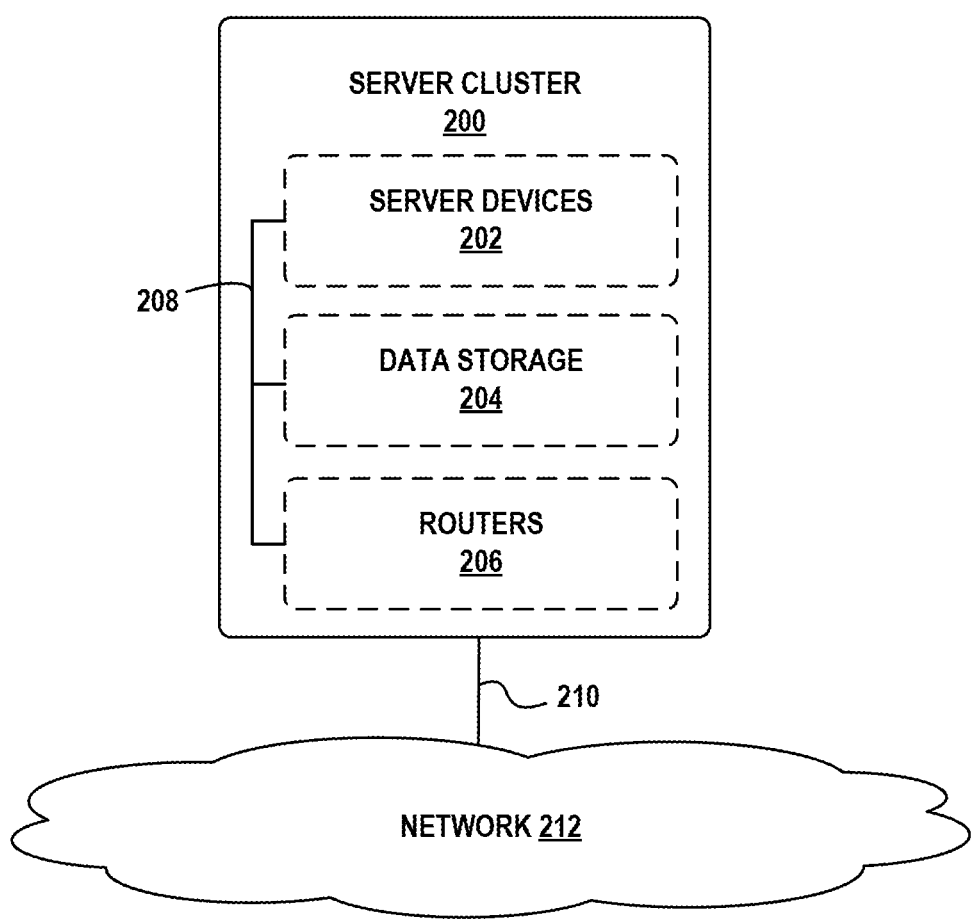
FIG. 2 illustrates a schematic drawing of a server device cluster, in accordance with example embodiments.

FIG. 2 depicts a cloud-based server cluster 200 in accordance with example embodiments. In FIG. 2, one or more operations of a computing device (e.g., computing system 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200. In some examples, server cluster 200 may perform one or more operations described herein, including the use of neural networks and implementation of volumetric performance capture with neural rendering techniques.

Server devices 202 can be configured to perform various computing tasks of computing system 100. For example, one or more computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

II. Artificial Neural Network

A. Example ANN

An artificial neural network (ANN) is a computational model in which a number of simple units, working individually in parallel and without central control, can combine to solve complex problems. An ANN is represented as a number of nodes that are arranged into a number of layers, with connections between the nodes of adjacent layers.

Figure 3A:
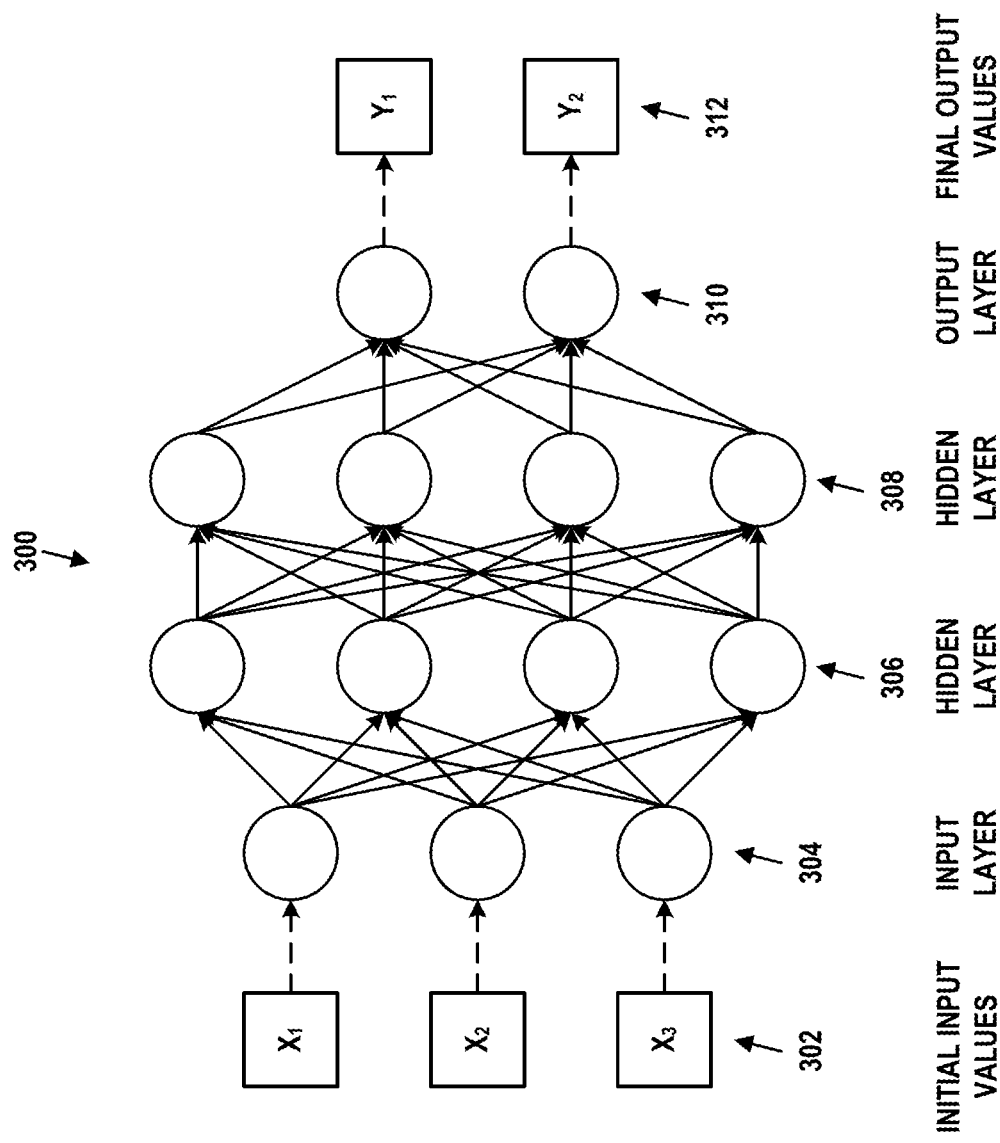
FIG. 3A depicts an ANN architecture, in accordance with example embodiments.

An example ANN 300 is shown in FIG. 3A. Particularly, ANN 300 represents a feed-forward multilayer neural network, but similar structures and principles are used in convolution neural networks (CNNs), recurrent neural networks, and recursive neural networks, for example. ANN 300 can represent an ANN trained to perform particular tasks, such as image processing techniques (e.g., segmentation, semantic segmentation, image enhancements) or learning volumetric performance capture with neural rendering functions described herein. In further examples, ANN 300 can learn to perform other tasks, such as computer vision, risk evaluation, etc.

As shown in FIG. 3A, ANN 300 consists of four layers: input layer 304, hidden layer 306, hidden layer 308, and output layer 310. The three nodes of input layer 304 respectively receive $X_1$, $X_2$, and $X_3$ as initial input values 302. The two nodes of output layer 310 respectively produce $Y_1$ and $Y_2$ as final output values 312. As such, ANN 300 is a fully-connected network, in that nodes of each layer aside from input layer 304 receive input from all nodes in the previous layer.

The solid arrows between pairs of nodes represent connections through which intermediate values flow, and are each associated with a respective weight that is applied to the respective intermediate value. Each node performs an operation on its input values and their associated weights (e.g., values between 0 and 1, inclusive) to produce an output value. In some cases this operation may involve a dot-product sum of the products of each input value and associated weight. An activation function may be applied to the result of the dot-product sum to produce the output value. Other operations are possible.

For example, if a node receives input values $\{x_1, x_2, \ldots, x_n\}$ on n connections with respective weights of $\{w_1, w_2, \ldots, w_n\}$, the dot-product sum d may be determined as:

$$d = \Sigma_{i=1}^{n} x_i w_i + b \qquad (1)$$

Where b is a node-specific or layer-specific bias.

Notably, the fully-connected nature of ANN 300 can be used to effectively represent a partially-connected ANN by giving one or more weights a value of 0. Similarly, the bias can also be set to 0 to eliminate the b term.

An activation function, such as the logistic function, may be used to map d to an output value y that is between 0 and 1, inclusive:

$$y = \frac{1}{1 + e^{-d}} \qquad (2)$$

Functions other than the logistic function, such as the sigmoid or tanh functions, may be used instead.

Then, y may be used on each of the node's output connections, and will be modified by the respective weights thereof. Particularly, in ANN 300, input values and weights are applied to the nodes of each layer, from left to right until final output values 312 are produced. If ANN 300 has been fully trained, final output values 312 are a proposed solution to the problem that ANN 300 has been trained to solve. In order to obtain a meaningful, useful, and reasonably accurate solution, ANN 300 requires at least some extent of training.

B. Training

Training an ANN may involve providing the ANN with some form of supervisory training data, namely sets of input values and desired, or ground truth, output values. For example, supervisory training to enable an ANN to perform image processing tasks can involve providing pairs of images that include a training image and a corresponding ground truth mask that represents a desired output (e.g., desired segmentation) of the training image. For ANN 300, this training data may include m sets of input values paired with output values. More formally, the training data may be represented as:

$$\{X_{1,i}, X_{2,i}, X_{3,i}, \widehat{Y_{1,i}}, \widehat{Y_{2,i}}\} \qquad (3)$$

Where i=1 ... m, and $\widehat{Y_{1,i}}$ and $\widehat{Y_{2,i}}$ are the desired output values for the input values of $X_{1,i}$, $X_{2,i}$, and $X_{3,i}$.

The training process involves applying the input values from such a set to ANN 300 and producing associated output values. A loss function can be used to evaluate the error between the produced output values and the ground truth output values. In some instances, this loss function may be a sum of differences, mean squared error, or some other metric. In some cases, error values are determined for all of the m sets, and the error function involves calculating an aggregate (e.g., an average) of these values.

Once the error is determined, the weights on the connections are updated in an attempt to reduce the error. In simple terms, this update process should reward "good" weights and penalize "bad" weights. Thus, the updating should distribute the "blame" for the error through ANN 300 in a fashion that results in a lower error for future iterations of the training data. For example, the update process can involve modifying at least one weight of ANN 300 such that subsequent applications of ANN 300 on training images generates new outputs that more closely match the ground truth masks that correspond to the training images.

The training process continues applying the training data to ANN 300 until the weights converge. Convergence occurs when the error is less than a threshold value or the change in the error is sufficiently small between consecutive iterations of training. At this point, ANN 300 is said to be "trained" and can be applied to new sets of input values in order to predict output values that are unknown. When trained to perform image processing techniques, ANN 300 may produce outputs of input images that closely resemble ground truths (i.e., desired results) created for the input images.

Many training techniques for ANNs make use of some form of backpropagation. During backpropagation, input signals are forward-propagated through the network the outputs, and network errors are then calculated with respect to target variables and back-propagated backwards towards the inputs. Particularly, backpropagation distributes the error one layer at a time, from right to left, through ANN 300. Thus, the weights of the connections between hidden layer 308 and output layer 310 are updated first, the weights of the connections between hidden layer 306 and hidden layer 308 are updated second, and so on. This updating is based on the derivative of the activation function.

Figure 3B:
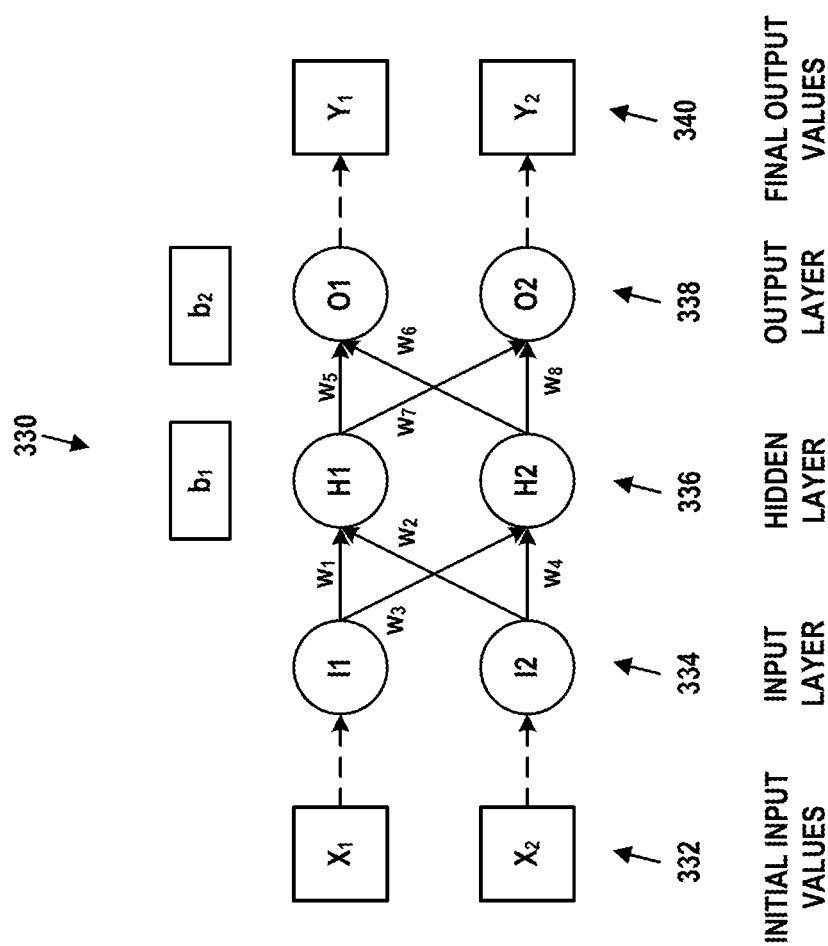
FIG. 3B depicts training an ANN, in accordance with example embodiments.

In order to further explain error determination and backpropagation, it is helpful to look at an example of the process in action. However, backpropagation can become quite complex to represent except on the simplest of ANNs. Therefore, FIG. 3B introduces a very simple ANN 330 in order to provide an illustrative example of backpropagation.

TABLE 1

| Weight | Nodes |
| --- | --- |
| $w_1$ | I1, H1 |
| $w_2$ | I2, H1 |
| $w_3$ | I1, H1 |
| $w_4$ | I2, H1 |
| $w_5$ | H1, O1 |
| $w_6$ | H2, O1 |
| $w_7$ | H1, O2 |
| $w_8$ | H2, O2 |

ANN 330 consists of three layers, input layer 334, hidden layer 336, and output layer 338, each having two nodes. Initial input values 332 are provided to input layer 334, and output layer 338 produces final output values 340. Weights have been assigned to each of the connections and biases (e.g., $b_1$, $b_2$ shown in FIG. 3B) may also apply to the net input of each node in hidden layer 336 in some examples. For clarity, Table 1 maps weights to pair of nodes with connections to which these weights apply. As an example, $w_2$ is applied to the connection between nodes I2 and H1, $w_7$ is applied to the connection between nodes H1 and O2, and so on.

The goal of training ANN 330 is to update the weights over some number of feed forward and backpropagation iterations until the final output values 340 are sufficiently close to designated desired outputs. Note that use of a single set of training data effectively trains ANN 330 for just that set. If multiple sets of training data are used, ANN 330 will be trained in accordance with those sets as well.

1. Example Feed Forward Pass

To initiate the feed forward pass, net inputs to each of the nodes in hidden layer 336 are calculated. From the net inputs, the outputs of these nodes can be found by applying the activation function. For node H1, the net input $net_{H1}$ is:

$$net_{H1} = w_1 X_1 + w_2 X_2 + b_1 \quad (4)$$

Applying the activation function (here, the logistic function) to this input determines that the output of node H1, $out_{H1}$ is:

$$out_{H1} = \frac{1}{1 + e^{-net_{H1}}} \quad (5)$$

Following the same procedure for node H2, the Output $out_{H2}$ can also be determined. The next step in the feed forward iteration is to perform the same calculations for the nodes of output layer 338. For example, net input to node O1, $net_{O1}$ is:

$$net_{O1} = w_5 out_{H1} + w_6 out_{H2} + b_2 \quad (6)$$

Thus, output for node O1, $out_{O1}$ is:

$$out_{O1} = \frac{1}{1 + e^{-net_{O1}}} \quad (7)$$

Following the same procedure for node O2, the output $out_{O2}$ can be determined. At this point, the total error, $\Delta$, can be determined based on a loss function. For instance, the loss function can be the sum of the squared error for the nodes in output layer 508. In other words:

$$\Delta = \Delta_{O1} + \Delta_{O2} \quad (8)$$

$$= \frac{1}{2}(out_{O1} - \hat{Y}_1)^2 + \frac{1}{2}(out_{O2} - \hat{Y}_2)^2$$

The multiplicative constant ½ in each term is used to simplify differentiation during backpropagation. Since the overall result is scaled by a learning rate anyway, this constant does not negatively impact the training. Regardless, at this point, the feed forward iteration completes and backpropagation begins.

2. Backpropagation

As noted above, a goal of backpropagation is to use $\Delta$ (i.e., the total error determined based on a loss function) to update the weights so that they contribute less error in future feed forward iterations. As an example, consider the weight $w_5$. The goal involves determining how much the change in $w_5$ affects $\Delta$. This can be expressed as the partial derivative $\partial \Delta / \partial w_5$. Using the chain rule, this term can be expanded as:

$$\frac{\partial \Delta}{\partial w_5} = \frac{\partial \Delta}{\partial out_{O1}} \times \frac{\partial out_{O1}}{\partial net_{O1}} \times \frac{\partial net_{O1}}{\partial w_5} \quad (9)$$

Thus, the effect on $\Delta$ of change to $w_5$ is equivalent to the product of (i) the effect on $\Delta$ of change to $out_{O1}$, (ii) the effect on $out_{O1}$ of change to $net_{O1}$, and (iii) the effect on $net_{O1}$ of change to $w_5$. Each of these multiplicative terms can be determined independently. Intuitively, this process can be thought of as isolating the impact of $w_5$ on $net_{O1}$, the impact of $net_{O1}$ on $out_{O1}$, and the impact of $out_{O1}$ on $\Delta$.

This process can be repeated for the other weights feeding into output layer 338. Note that no weights are updated until the updates to all weights have been determined at the end of backpropagation. Then, all weights are updated before the next feed forward iteration.

After updates to the remaining weights, $w_1$, $w_2$, $w_3$, and $w_4$ are calculated, backpropagation pass is continued to hidden layer 336. This process can be repeated for the other weights feeding into output layer 338. At this point, the backpropagation iteration is over, and all weights have been updated. ANN 330 may continue to be trained through subsequent feed forward and backpropagation iterations. In some instances, after over several feed forward and backpropagation iterations (e.g., thousands of iterations), the error can be reduced to produce results proximate the original desired results. At that point, the values of $Y_1$ and $Y_2$ will be close to the target values. As shown, by using a differentiable loss function, the total error of predictions output by ANN 330 compared to desired results can be determined and used to modify weights of ANN 330 accordingly.

In some cases, an equivalent amount of training can be accomplished with fewer iterations if the hyper parameters of the system (e.g., the biases $b_1$ and $b_2$ and the learning rate $\alpha$) are adjusted. For instance, the setting the learning rate closer to a particular value may result in the error rate being reduced more rapidly. Additionally, the biases can be updated as part of the learning process in a similar fashion to how the weights are updated.

Regardless. ANN 330 is just a simplified example. Arbitrarily complex ANNs can be developed with the number of nodes in each of the input and output layers tuned to address specific problems or goals. Further, more than one hidden layer can be used and any number of nodes can be in each hidden layer.

III. Convolutional Neural Networks

A convolutional neural network (CNN) is similar to an ANN, in that the CNN can consist of some number of layers of nodes, with weighted connections there between and possible per-layer biases. The weights and biases may be updated by way of feed forward and backpropagation procedures discussed above. A loss function may be used to compare output values of feed forward processing to desired output values.

On the other hand, CNNs are usually designed with the explicit assumption that the initial input values are derived from one or more images. In some embodiments, each color channel of each pixel in an image patch is a separate initial input value. Assuming three color channels per pixel (e.g., red, green, and blue), even a small 32×32 patch of pixels will result in 3072 incoming weights for each node in the first hidden layer. Clearly, using a naïve ANN for image processing could lead to a very large and complex model that would take long to train.

Instead, CNNs are designed to take advantage of the inherent structure that is found in almost all images. In particular, nodes in a CNN are only connected to a small number of nodes in the previous layer. This CNN architecture can be thought of as three dimensional, with nodes arranged in a block with a width, a height, and a depth. For example, the aforementioned 32×32 patch of pixels with 3 color channels may be arranged into an input layer with a width of 32 nodes, a height of 32 nodes, and a depth of 3 nodes.

Figure 4A:
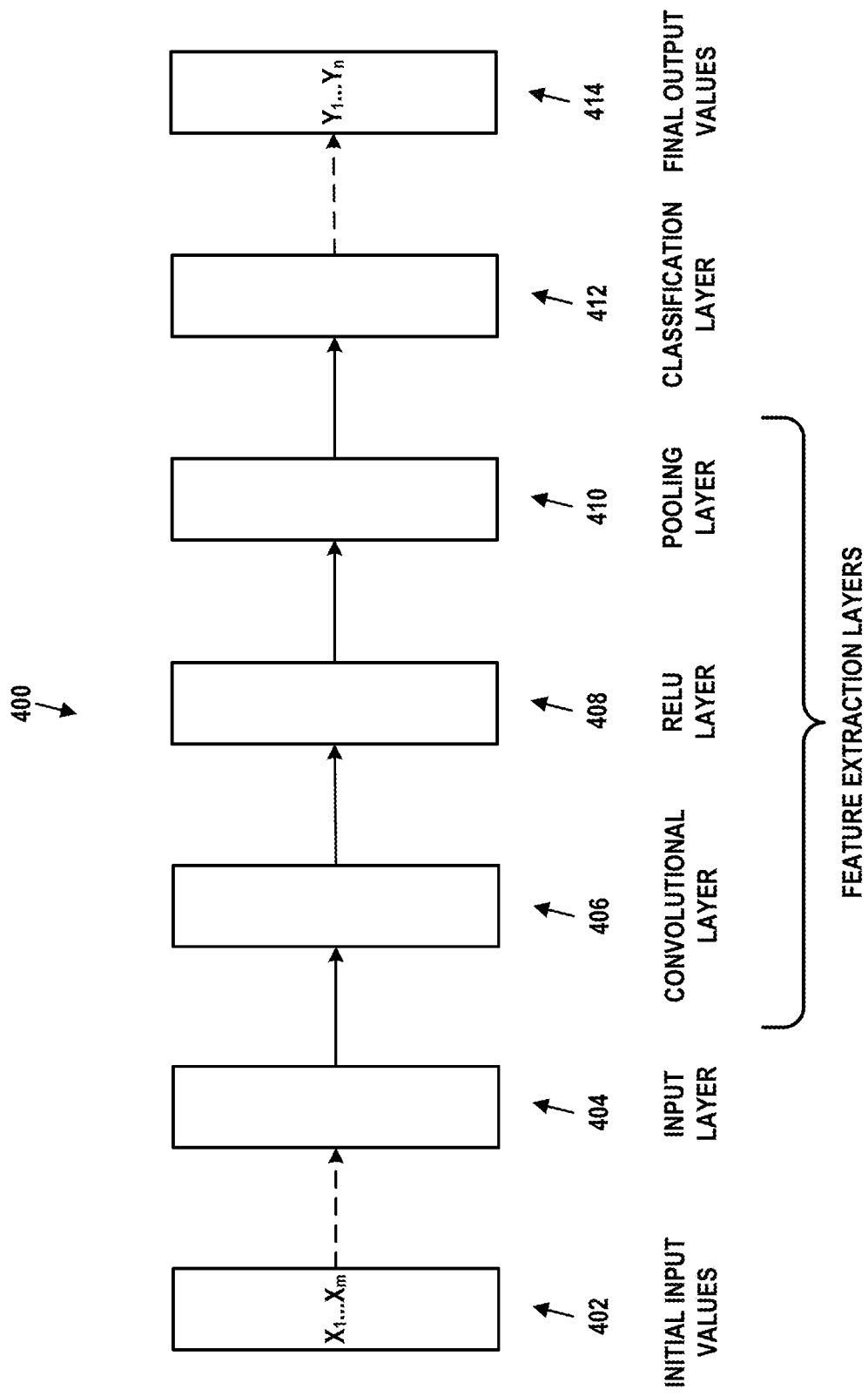
FIG. 4A depicts a convolution neural network (CNN) architecture, in accordance with example embodiments.

An example CNN 400 is shown in FIG. 4A. Initial input values 402, represented as pixels $X_1 \ldots X_m$, are provided to input layer 404. As discussed above, input layer 404 may have three dimensions based on the width, height, and number of color channels of pixels $X_1 \ldots X_m$. Input layer 404 provides values into one or more sets of feature extraction layers, each set containing an instance of convolutional layer 406, RELU layer 408, and pooling layer 410. The output of pooling layer 410 is provided to one or more classification layers 412. Final output values 414 may be arranged in a feature vector representing a concise characterization of initial input values 402.

Convolutional layer 406 may transform its input values by sliding one or more filters around the three-dimensional spatial arrangement of these input values. A filter is represented by biases applied to the nodes and the weights of the connections there between, and generally has a width and height less than that of the input values. The result for each filter may be a two-dimensional block of output values (referred to as an feature map) in which the width and height can have the same size as those of the input values, or one or more of these dimensions may have different size. The combination of each filter's output results in layers of feature maps in the depth dimension, in which each layer represents the output of one of the filters.

Figure 4B:
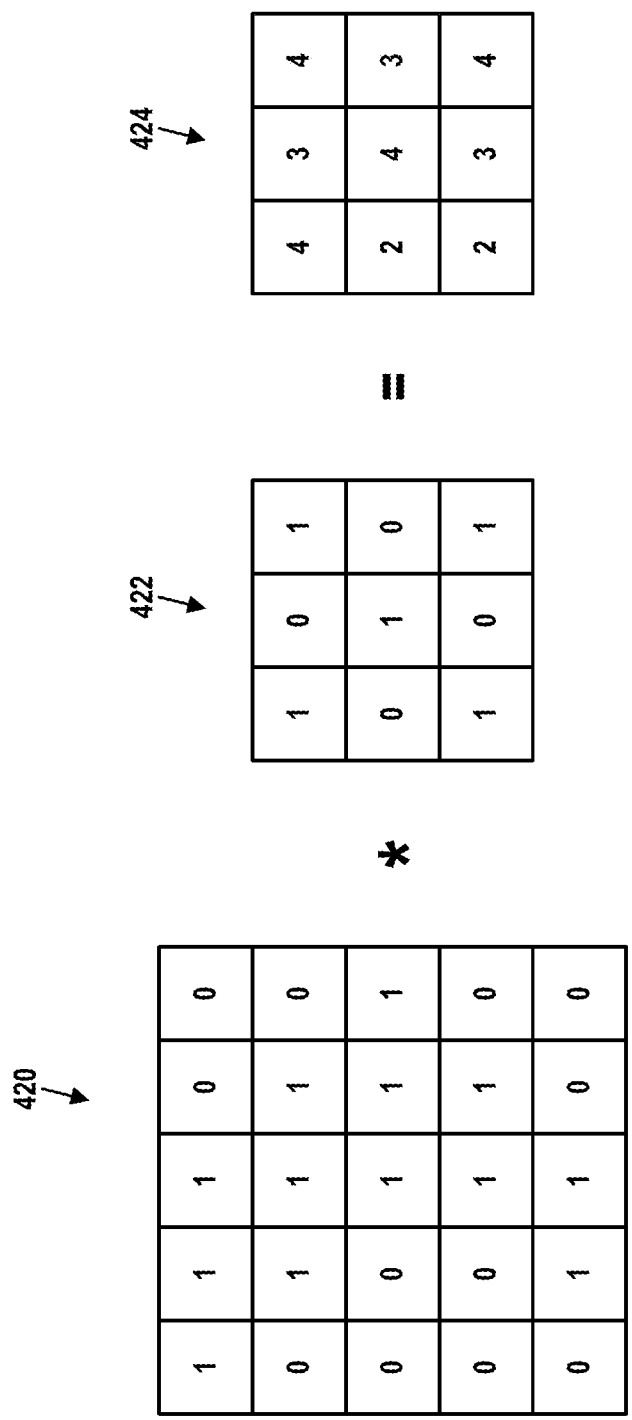
FIG. 4B depicts a convolution, in accordance with example embodiments

Applying the filter may involve calculating the dot-product sum between the entries in the filter and a two-dimensional depth slice of the input values. An example of this is shown in FIG. 4B. Matrix 420 represents input to a convolutional layer, and thus could be image data, for example. The convolution operation overlays filter 422 on matrix 420 to determine output 424. For instance, when filter 422 is positioned in the top left corner of matrix 420, and the dot-product sum for each entry is calculated, the result is 4. This is placed in the top left corner of output 424.

Turning back to FIG. 4A, a CNN learns filters during training such that these filters can eventually identify certain types of features at particular locations in the input values. As an example, convolutional layer 406 may include a filter that is eventually capable of detecting edges and/or colors in the image patch from which initial input values 402 were derived. A hyper-parameter called receptive field determines the number of connections between each node in convolutional layer 406 and input layer 404. This allows each node to focus on a subset of the input values.

RELU layer 408 applies an activation function to output provided by convolutional layer 406. In practice, it has been determined that the rectified linear unit (RELU) function, or a variation thereof, appears to provide strong results in CNNs. The RELU function is a simple thresholding function defined as $f(x)=\max(0, x)$. Thus, the output is 0 when x is negative, and x when x is non-negative. A smoothed, differentiable approximation to the RELU function is the softplus function. It is defined as $f(x)=\log(1+e^x)$. Nonetheless, other functions may be used in this layer.

Pooling layer 410 reduces the spatial size of the data by down-sampling each two-dimensional depth slice of output from RELU layer 408. One possible approach is to apply a 2×2 filter with a stride of 2 to each 2×2 block of the depth slices. This will reduce the width and height of each depth slice by a factor of 2, thus reducing the overall size of the data by 75%.

Classification layer 412 computes final output values 414 in the form of a feature vector. As an example, in a CNN trained to be an image classifier, each entry in the feature vector may encode a probability that the image patch contains a particular class of item (e.g., a human face, a cat, a beach, a tree, etc.).

In some embodiments, there are multiple sets of the feature extraction layers. Thus, an instance of pooling layer 410 may provide output to an instance of convolutional layer 406. Further, there may be multiple instances of convolutional layer 406 and RELU layer 408 for each instance of pooling layer 410.

CNN 400 represents a general structure that can be used in image processing. Convolutional layer 406 and classification layer 412 apply weights and biases similarly to layers in ANN 300, and these weights and biases may be updated during backpropagation so that CNN 400 can learn. On the other hand, RELU layer 408 and pooling layer 410 generally apply fixed operations and thus might not learn.

Not unlike an ANN, a CNN can include a different number of layers than is shown in the examples herein, and each of these layers may include a different number of nodes. Thus, CNN 400 is merely for illustrative purposes and should not be considered to limit the structure of a CNN.

IV. Example Systems

The increasing demand for 3D content in augmented and virtual reality has motivated the development of volumetric performance capture systems. Recent advances are pushing free viewpoint relightable videos of dynamic human performances closer to photorealistic quality. Despite significant efforts, however, existing sophisticated systems are limited by reconstruction and rendering algorithms that do not fully model complex 3D structures and high order transport effects, such as a global illumination and sub-surface scattering.

Because traditional geometric pipelines typically rely upon an inadequate geometric model, the meshes or 3D voxels of any reasonable density may not be expressive enough to capture fine grained details, such as hair. In addition, traditional geometric pipelines can have 3D acquisition errors. As a result, even if a mesh could be used to accurately model the geometry, the reconstruction may be inaccurate due to erroneous calibration or approximations in the many stages of a reconstruction pipeline. In addition, typical models may not be expressive enough to take into account the complex image formation process that would lead to a photo-realistic rendering of a human. Rather, traditional geometric pipelines often rely on many assumptions and approximations that ignore high order light transport effects (e.g., sub-surface scattering and global illumination), which can lead to unrealistic renderings.

Figure 5:
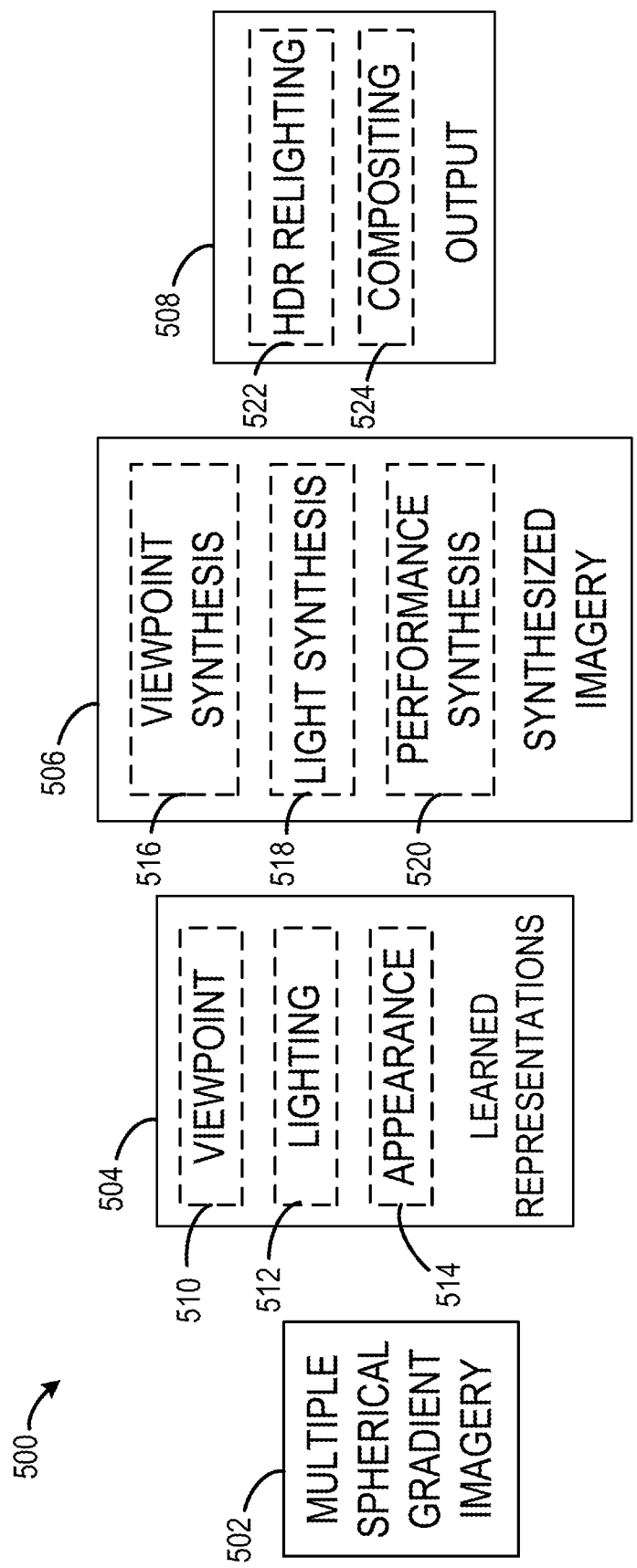
FIG. 5 illustrates a neural architecture system, according to one or more example embodiments, in accordance with one or more example embodiments.

To overcome the above difficulties, techniques described herein can be used to leverage deep learning in a way that can address different substantial drawbacks typically associated with traditional geometric pipelines. Particularly, FIG. 5 illustrates a neural architecture system, according to one or more example embodiments. System 500 includes multiple spherical gradient imagery 502, learned representations 504, synthesized imagery 506, and output 508. In other embodiments, system 500 may include other components.

System 500 represents a combination of geometric pipelines with a neural rendering scheme to generate one or more photorealistic renderings of dynamic performances that can be viewed from different viewpoints with appropriate lighting applied at each viewpoint. As such system 500 may use one or more neural networks that can model the classical rendering process to learn implicit features that represent the view-dependent appearance of the subject independent of the geometry layout, which can enable for generalization to unseen subject poses and even novel subject identity. As such, system 500 can generate high-quality results that significantly outperform the existing state-of-the-art solutions.

Multiple spherical gradient imagery 502 may include using multi-view imagery of performers acquired with two spherical gradient illumination conditions and the knowledge of a 3D parametrized geometry. For example, a computing system may use multi-view imagery of performers acquired with two spherical gradient illumination conditions, the knowledge of the 3D parameterized geometry, and ground truth images under a specific illumination condition and alpha masks. In order to obtain the data needed for training, some examples may involve using a Light Stage. For instance, a Light Stage may include a custom spherical dome with 331 fully programmable LEDs. This Light Stage can be used to capture images of a subject in different poses and under various lighting conditions.

In an example embodiment, a computing device may obtain multi-view imagery using multiple high resolution red, green, blue (RGB) cameras that can record video at 60 hertz with a 12.4 megapixel resolution. As such, a system may be used to interleave two different visible lighting conditions based on spherical gradient illumination. A spherical gradient image can be obtained by programming the LEDs to emit a color that changes with respect to its position in the Light Stage. In particular, given the lighting direction vector θ of a LED relative to the center of the stage, the light emitted by that LED for the first gradient is programmed to have the RGB color as follows:

$$\left(\frac{(1+\theta_x)}{2}, \frac{(1+\theta_y)}{2}, \frac{(1+\theta_z)}{2}\right) \quad (1)$$

and the second gradient can be programmed to have the RGB color as follows:

$$\left(\frac{(1-\theta_x)}{2}, \frac{(1-\theta_y)}{2}, \frac{(1-\theta_z)}{2}\right). \quad (2)$$

To acquire the base geometry needed to pre-compute the warp fields, infrared (IR) cameras can be used, which are coupled with 16 custom structured light projectors such that they can be used for active stereo depth estimation. A multi-view stereo algorithm followed by a Poisson reconstruction step and a parameterization phase can be used to retrieve the final geometry. Given the base geometry, light visibility maps and reflections maps can be computed and provided to a neural renderer.

Training system 500 can further involve acquiring target images by collecting full reflectance fields. For instance, a sequence of One-Light-At-a-Time (OLAT) images can be captured with each OLAT image having only one of the LEDS turned on with a known light direction pointing from the center of the Light Stage to the LED position. A single sequence may consist of 331 OLATs for 58 high resolution RGB cameras and 32 active IR sensors. Due to the large amount of data, a framerate of 60 Hz may be used. This results in 6 seconds approximately per sequence acquisition, during which the subject (e.g., a person) may move a little resulting in misalignments in the training data.

To compensate for the misalignments, additional tracking frames with all the LEDs turned on may be included. In particular, the fully lit images may be acquired after every $10^{th}$ OLAT and subsequently used to perform an optical flow alignment in image space for each view with respect to a selected key frame. The optical flow can then be interpolated to align OLAT images between two tracking frames. The spherical gradient illumination conditions that are used as input to the system can also be captured. Since all the 2D imagery is aligned to a given reference frame, system 500 might not need to compute the geometry for all the OLATs. Rather, the system may rely on the parameterized mesh computed for a selected key frame. The alpha masks used during training can be trained using Light Stage data.

In some examples, the feature extractor, neural texture, and neural rendering components of the pipeline are trained using a combination of multiple losses. An example loss function can be defined by photometric loss in feature space, alpha loss, reflection saliency loss, and texture loss.

Learned representations 504 represents one or more representations that can be used to perform operations herein. For instance, learned representations 504 may correspond to one or more neural networks in some examples. Training learned representations 504 may involve using one or more loss functions. For example, for Photometric Loss in Feature Space $L_{VGG}(I, \hat{I})$, a system may use the squared $\ell_2$ distance between features extracted from the target image I and the predicted image $\hat{I}$ using a VGG network pre-trained on an image data classification task. This loss can lead to sharper results compared to a traditional $\ell_1$ distance in image space. For Alpha Loss $\ell_1(M, \hat{M})$, in order to infer the alpha mask, an $\ell_1$ norm may be computed between the groundtruth mask M and the inferred mask $\hat{M}$. For Reflection Saliency Loss $L_{VGG}(S, \hat{S})$, the network may be learn specular highlights and view dependent effects via an additional reflection loss. In particular, S=R⊙I may be defined, where R is a reflection map and ⊙ indicates elementwise multiplication. Similarly, $\hat{S}$=R⊙$\hat{I}$ may be defined for the predicted image $\hat{I}$. The reflection loss can be computed as $\ell_2$ distance of S and $\hat{S}$ in feature space using the VGG network. This loss can be helpful to recovering view dependent effects. For Texture Loss $L_{VGG}(I, N)$, a loss between the target image I and the first 3 channels of the resampled neural texture N can be used. The loss can cause the network to represent part of its texture space as an actual RGB image.

The total loss can be defined as follows:

$$L_{total} = w_1 L_{VGG}(I, \hat{I}) + w_2 \ell_1(M, \hat{M}) + w_3 L_{VGG}(S, \hat{S}) + w_4 L_{VGG}(I, N) \quad (3)$$

where weights $w_i$ can be used to control the contribution of the individual loss functions to the total loss. In an example embodiment, the total loss function may use the following: $w_1$=1.0, $w_2$=0.25, $w_3$=0.5, and $w_4$=1.0.

In the embodiment shown in FIG. 5, learned representations 504 includes viewpoint 510, lighting 512, and appearance 514. Learned representations 504 may include one or more neural networks configured to adjust parameters, such as viewpoint 510, lighting 512, and appearance 514.

Synthesized imagery 506 represents different images of the subject from different perspectives with different modifications applied. In the embodiment shown in FIG. 5, synthesized imagery includes view point synthesis 516, light synthesis 518, and performance synthesis 520. View point synthesis 516 involves developing one or more images according to a particular viewpoint or multiple viewpoints. Light synthesis 518 involves adjusting a lighting applied to the subject within images as represented by synthesized imagery 506. Performance synthesis 520 involves displaying a subject in different poses that resemble realistic poses that a person may perform.

Output 508 represents different images showing the subject from different perspectives. In addition, output 508 may include images depicting the subject in different simulated environments. In the embodiment shown in FIG. 5, output 508 involves high-dynamic-range (HDR) relighting 522 and compositing 524. For example, a neural renderer may perform techniques related to HDR relighting 522 and compositing 524.

Figure 6:
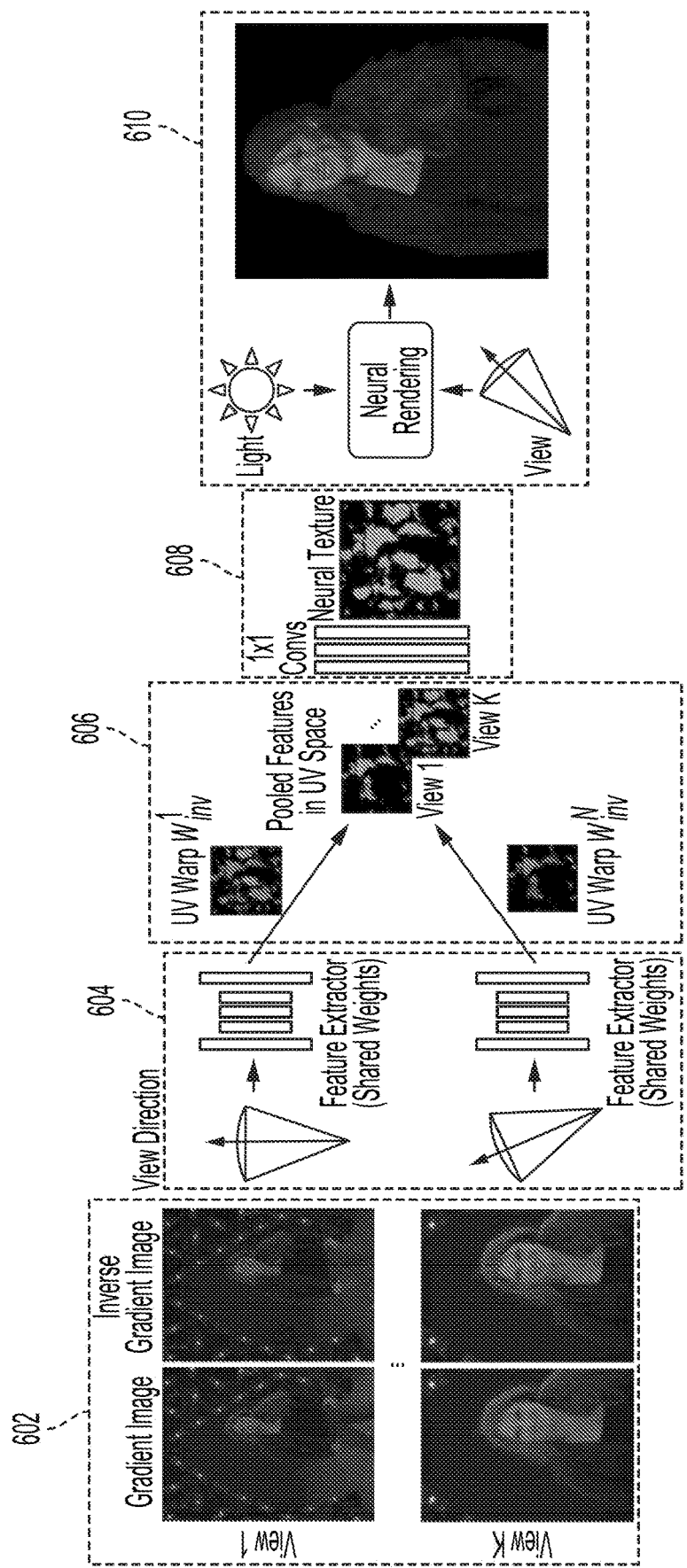
FIG. 6 illustrates a neural rendering pipeline, according to one or more example embodiments.

FIG. 6 illustrates a neural rendering pipeline (NRP), according to one or more example embodiments. NRP 600 represents an example pipeline that can be used to render a subject (i.e., a person) in any desired viewpoint and lighting. Particularly, operations of the NRP 600 include image capture 602, feature extraction 604, feature mapping 606, neural texture generation 608, and neural rendering 610. In other examples NRP 600 may involve other operations.

As shown in FIG. 6, NRP 600 may initially involve image capture 602 to obtain images depicting one or more views of a subject. In the example embodiment, the subject is a person wearing arbitrary clothing. NRP 600 can be used to render a subject performing various motions and in any type of clothing. As such, the subject can differ in other embodiments.

NRP 600 further involves feature extraction 604 from the images obtained during image capture 602. For instance, a feature can be extracted from one or both image within each pair of gradient and inverse gradient images.

NRP 600 may further involve pooling the features extracted via feature extraction 604 together into a texture space (e.g., the UV space). In particular, NRP 600 may use pre-acquired coarse geometry estimations to pool together and map the features into the texture space for feature mapping 606. The pooled features can then be transformed using convolutions (e.g., 1×1 convolutions) to extract implicit reflectance and local geometry information corresponding to the subject, which can then be re-projected into the image space of a novel desired viewpoint for neural texture generation 608.

The re-projected features can be provided in combination with classical graphics buffers (e.g., light visibility maps and reflection maps) as an input to a neural renderer at neural texture generation 608. The neural renderer can use the input to generate and display the final output image of the subject lit under a desired lighting direction on a display interface. By sampling the lighting direction over a unit sphere, neural texture generation 608 may involve generating a set of images that form the full reflectance basis for the frame. Particularly, the full reflectance basis can be used to relight the image under arbitrary lighting environments. As such, NRP 600 may use neural texture generation 608 to replace the use of an explicit Bidirectional Reflectance Distribution Function (BRDF) and also enable the modeling of higher-order light transport effects directly from training data. In addition, neural texture generation 608 can circumvent the strict dependency on accurate geometry by compensating for potential inaccuracies (e.g., filling in missing hair for a person).

Unlike models that learn a fixed neural texture, NRP 600 may initially extract features from images and then pool the features in texture space using pre-computed warp fields that remap the images to UV space. As a result, the neural textures can be regressed from input images, which differs from other existing techniques that typically limit generalization by optimizing neural textures through back-propagation.

The extracted features may have a certain spatial extent thanks to the receptive fields of the feature extraction network. This implies that in texture space, NRP 600 can resort to simple 1×1 convolutions, which do not depend on the UV arrangement. The use of 1×1 convolutions can be justified by geometric capture systems, which can obtain reflectance maps with simple per-pixel operations in RGB space. The learned 1×1 operators on features vectors can be superior to hand-crafted per-pixel operations in RGB space and further enhance disentangling appearance. In some instances, a new neural texture can be built from a set of multi-view images and an approximate parametrized geometry (i.e., pre-computed warps from image space to UV parameterization). As a byproduct, NRP 600 can be used by a computing device to generalize to unseen performances without a need to re-train the network even if the UV parameterization changes. As such, a computing device can perform NRP 600 to achieve simultaneous synthesis of appearance, viewpoint, and lighting of dynamic performances.

In some examples, NRP 600 may be configured to assume the availability of an approximate geometry of the subject for every frame of the performance. For instance, a geometry estimate can be used to generate a UV map of the surface along with warp fields that map multi-view images into the texture space and vice versa. Because it is generally difficult to achieve a temporally coherent UV parameterization for a non-rigidly deforming geometry for dynamic performances, NRP 600 may involve an assumption that no such temporal correspondences for even consecutive frames in some instances. For example, these example techniques may be designed to be robust to arbitrary texture space changes and can provide generalization of appearance synthesis across subject pose and identity.

To capture the input 2D images, some example techniques use a Light Stage, which represents a studio device containing a capture volume inside a spherical dome fitted with calibrated Red Green Blue (RGB) lights and multi-view cameras. By using a Light Stage, spherical gradient illumination conditions can be determined and subsequently used to extract information regarding surface normals, albedo and roughness. For instance, deep learning can be applied to these inputs to obtain convincing relighting results in image space. As such, an example system may use images captured under spherical gradient illumination conditions from various camera viewpoints and align complementary lighting conditions extracted from images using 2D optical flow process.

A view direction vector can be concatenated to each pixel by the system. The view direction vector may be a ray going from the optical center to the center of the pixel in world space, which results in a 3D unit vector that can be encoded in two channels. The view direction can provide the network with some guidance regarding the view-dependent effects on a given image. In some examples, a U-Net architecture is used to extract features from each viewpoint. For example, the U-Net architecture may take multiple inputs, such as 8 channels with 6 channels for two gradient images and 2 channels for the view direction.

The specific network used by the system may include 5 encoder/decoder layers with 16, 32, 64, 128, 256 filters, extracted with 3×3 convolutions followed by a blur pool in the encoder and blur unpool in the decoder. In addition, the system may also include a final output layer that infers a tensor of 16 channels with 2000×1500 resolution.

The U-Net architecture may be used by the system to extract features with receptive fields with a reasonable spatial extent (e.g., 478×478). The final output can have the same resolution as input images, which can preserve all the high frequency details. The feature extraction can be performed for each view, which may result in multiple feature tensors having multiple channels (e.g., 16 channels) being generated.

NRP 600 may be configured to enable learning to regress the texture space. For example, at this stage, NRP 600 may include one tensor F with 16 channels and 2000×1500 for each camera view. Assuming that a 3D geometry with parameterization is available, NRP 600 can be configured to compute warp fields that map each pixel from image space to the UV texture space. The warp fields may be pre-computed using 3D geometry to map between texture UV coordinates and camera image coordinates with explicit occlusion handling via ray casting. For example, a 2000×1500 warp field $W^k(x,y)=(u,v)$ as a 2-channel map from each pixel of camera k to UV coordinates of parameterization, which can be implemented as the rasterization of raw UV coordinates on geometry for camera k. For the inverse mapping $W_{inv}^k(u,v)=(x,y)$, a 1000×100 warp field matching can be constructed to match the UV texture dimension, where the 2-channel value at each UV texel is the visibility-tested projection from the parameterized geometry into the image coordinates of camera k. These warp fields can be used in an end-to-end framework in a fully differentiable manner.

The warped feature tensors $F_w^1, \ldots, F_w^N$ can be pooled together into a single tensor, which can remove the dependency on the order of the input images. To do so, NRP 600 can perform a weighted sum of the features, where the weights are computed using the dot product between the camera viewing direction and the surface normals. This is inspired by traditional volumetric capture pipelines, which can utilize a similar weighted scheme to stitch together multiple views in the UV space. This can generate a texture space tensor of 1000×1000×16. Due to this high dimensional feature vector, NRP 600 can involve relying on a few 1×1 convolutions followed by non-linearities in texture space, which can allow for generalization for different parameterizations. In particular, a computing device can perform three 1×1 convolutions followed by ReLU activations to obtain a final texture space tensor with 16 channels.

Figure 7:
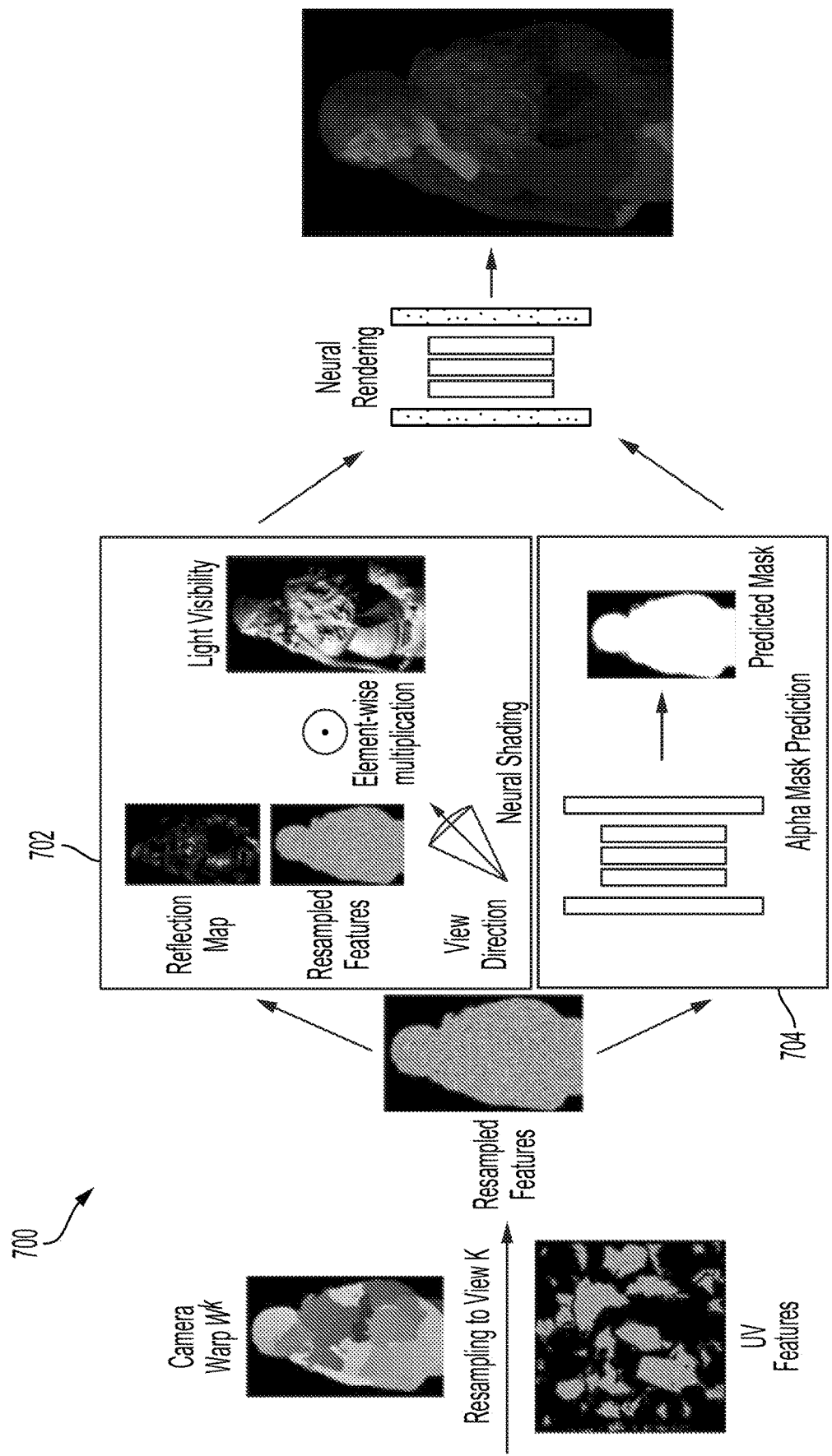
FIG. 7 illustrates a neural renderer module, according to one or more example embodiments.

FIG. 7 illustrates a neural renderer module, according to one or more example embodiments. Module 700 can input a target camera view that can be used to generate a warp $W^k$, which can be used to resample features from the texture space to the image space. As shown in the embodiment illustrated in FIG. 7, module 700 may include neural shading subsystem 702 and alpha matting subsystem 704. The output from these subsystems 702-704 can be passed through a final U-Net that can generate the actual rendered images.

The resampled features can encode surface and material properties and may not contain information regarding the desired viewpoint or light condition. To enable neural shading subsystem 702 to learn the shading function, a light visibility map and a reflection map (or multiple maps) can be used and casted in a neural network framework. In particular, the light visibility map can be computed per-pixel via the dot product between the surface normal n and the target lighting direction L. Occlusions can be handled explicitly via ray casting, which can result in black pixels in the light visibility map. The reflection map may be defined as $(r \cdot v)^\alpha$, where v is the view direction of the target camera and r=2(1·n)n−1. The reflection map can be used to guide a neural network towards secularities and view dependent effects. As such, the reflection map can be input to NRP 600 to aid with the specularity synthesis.

The resampled neural features, the reflection map, and the view direction (encoded per-pixel in 2 channels) can be concatenated into a tensor S. For instance, tensor S may have dimension 2000×1500 with 19 channels that consist of 16 channels for the features, 1 channel for the reflection map, and 2 channels for view direction. NRP 600 may multiply tensor S element-wise with the light visibility map to simulate a neural diffuse rendering.

Module 700 may also include a neural network (e.g., a small U-Net with skip connections) that is configured to input the resampled features (e.g., size 2000×1500) and comprehend convolution layers for one or more encoder and/or decoders, such as an encoder and decoder with 3×3 filters, with outputs 8, 16, 32, 64, 128, 256. The neural network may output an alpha mask, which can be used for the application of compositing in virtual environments.

Module 700 can concatenate the outputs from neural shading subsystem 702 and alpha matting subsystem 704 and pass the concatenated output to a final neural network (eg., U-Net) to perform the final rendering. For example, module 700 can input a tensor of 20 channels (e.g., 19 channels for the neural shader, 1 channel for the alpha mask) of size 2000×1500 and pass the tensor through 5 levels for the encoder and 5 levels for the decoder. As such, module 700 can use 3×3 convolutions with outputs 64, 128, 256, 512, 1024. Additionally, in some examples, skip connections can be employed between the encoder and decoder, except for the last layer that generates the final RGB image. Given multi-view images of a performer, the neural texture may only be built once with module 700 configured to synthesize any novel illumination condition from any desired viewpoint.

V. Example Methods

Figure 8:
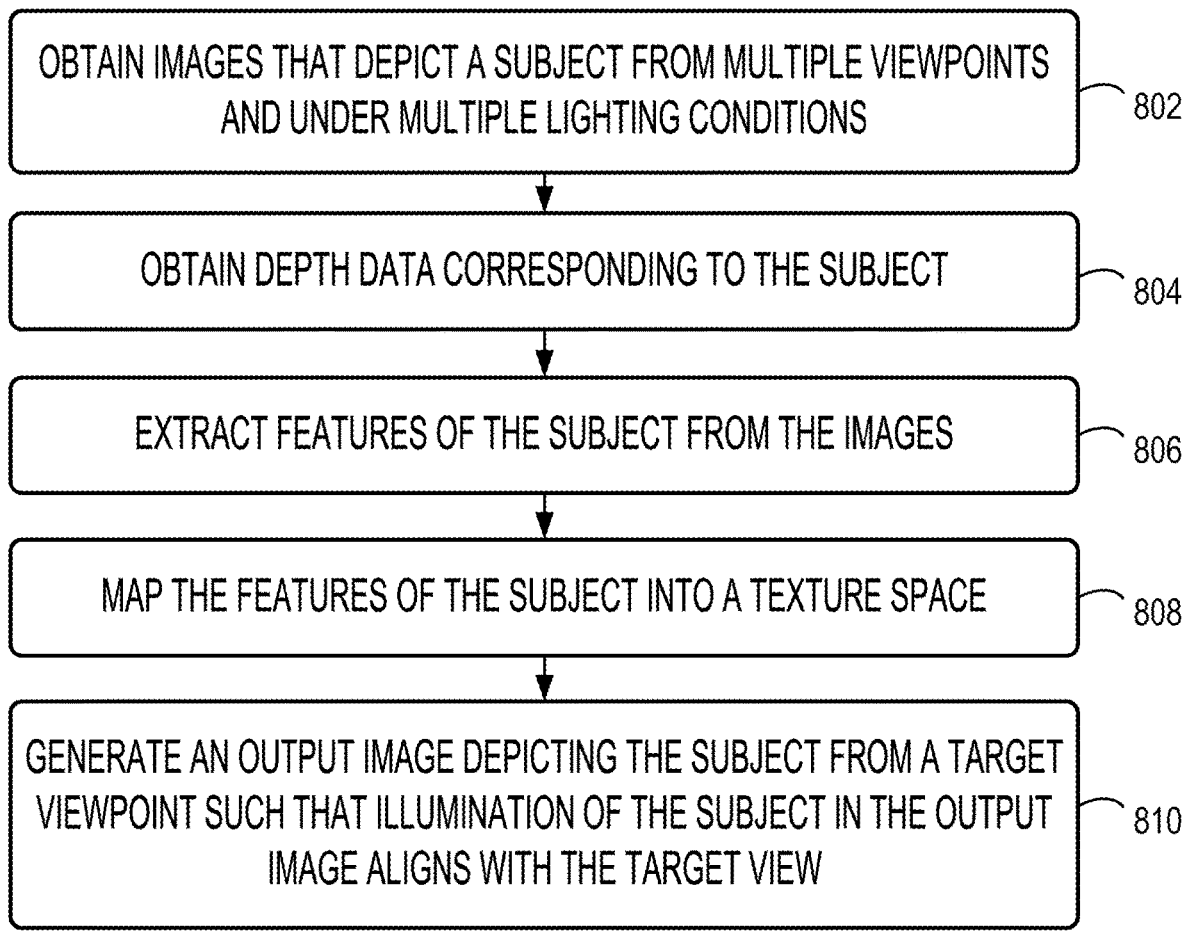
FIG. 8 is a flow chart of a method for volumetric performance capture with neural rendering, according to one or more example embodiments.

FIG. 8 is a flow chart of a method for volumetric performance capture with neural rendering. Method 800 may include one or more operations, functions, or actions as illustrated by one or more of blocks 802, 804, 806, 808, and 810. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for method 800 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive.

The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example.

The computer readable media may also be any other volatile or non-volatile storage systems. The computer readable medium may be considered a computer readable storage medium, a tangible storage device, or other article of manufacture, for example. Furthermore, for method 800 and other processes and methods disclosed herein, each block in FIG. 8 may represent circuitry that is wired to perform the specific logical functions in the process.

At block 802, method 800 involves obtaining images that depict a subject from multiple viewpoints and under multiple lighting conditions. For example, a system may use a camera system and a light stage having multiple lights to capture images of a person posing as the subject. The subject may wear arbitrary clothing and can be in one or more poses during image capture.

In some examples, the camera system and the light stage can be used to capture a set of image pairs depicting the subject under spherical gradient illumination conditions such that each image pair includes a gradient image and an inverse gradient image. The camera system and the light stage can also be used to capture a series of images that depict the subject under one-light-at-a-time conditions such that each image from the series of images depicts the subject under illumination from a single light from the lights of the light stage.

At block 804, method 800 involves obtaining depth data corresponding to the subject. For instance, the system may include multiple infrared cameras positioned to capture depth data of the subject. For instance, the infrared cameras may be located at fixed positions strategy relative to the light stage to enable 3D measurements to be captured representing the surfaces of the subject.

In some examples, the system may estimate a coarse geometry for the subject based on the depth data. The coarse geometry may indicate the structure of the surfaces of the person. As a result, the person can wear any type of clothing without limiting the functionality of the system.

At block 806, method 800 involves extracting features of the subject from the images. A neural network may extract the features of the subject from the multiple images based on the depth data corresponding to the subject.

In some examples, feature extraction may involve extracting a feature from each image based on the coarse geometry estimated for the subject. For instance, a convolution neural network may extract the feature from each image.

At block 808, method 800 involves mapping the features of the subject into a texture space. In particular, the neural network may map the features of the subject into the UV texture space. Mapping the features into the texture space may be performed such that the features encode both local and global geometric properties and four dimensional (4D) reflectance. Mapping may also involve determining one or more warp fields configured to map pixels from an image space to the texture space. Each warp field can be determined using the depth data corresponding to the subject.

Mapping, using the neural network, the features of the subject into the texture space may involve pooling the features of the subject extracted from the images and transforming, using a convolution neural network, the features to extract implicit reflectance and local geometry information. The pooled features may be reprojected into an image space corresponding to the target viewpoint. The features reprojected into the image space corresponding to the target viewpoints may be provided with one or more graphical buffers as inputs to the neural renderer. The graphical buffers can include a light map and/or a reflection map determined based on the implicit reflectance and local geometry information.

At block 810, method 800 involves generating, using a neural renderer, an output image depicting the subject from a target view such that illumination of the subject in the output image aligns with the target view. In some examples, the neural renderer is configured to resample the features of the subject from the texture space to an image space to generate the output image.

In some examples, the system may cause the neural renderer to use the features reprojected into the image space corresponding to the target viewpoint with the one or more graphical buffers to generate the output image depicting the subject from the target view. The neural renderer may depict the subject in an arbitrary environment. For example, the neural renderer may access environments from a database and use one or more to depict the subject in a different environment.

In some examples, the neural renderer may generate a series of images depicting the subject from multiple views such that the illumination of the subject in each image aligns with a particular view associated with the image. The neural renderer may adjust the pose of the subject within the series of images. The series of images may correspond to a video.

Method 800 may further involve receiving an input specifying a second target view. For instance, a computing device may receive a user input specifying the second target view. Method 800 may also involve, responsive to the input, generating a second output image depicting the subject from the second target view such that illumination of the subject in the second output image aligns with the second target view.

Figure 9:
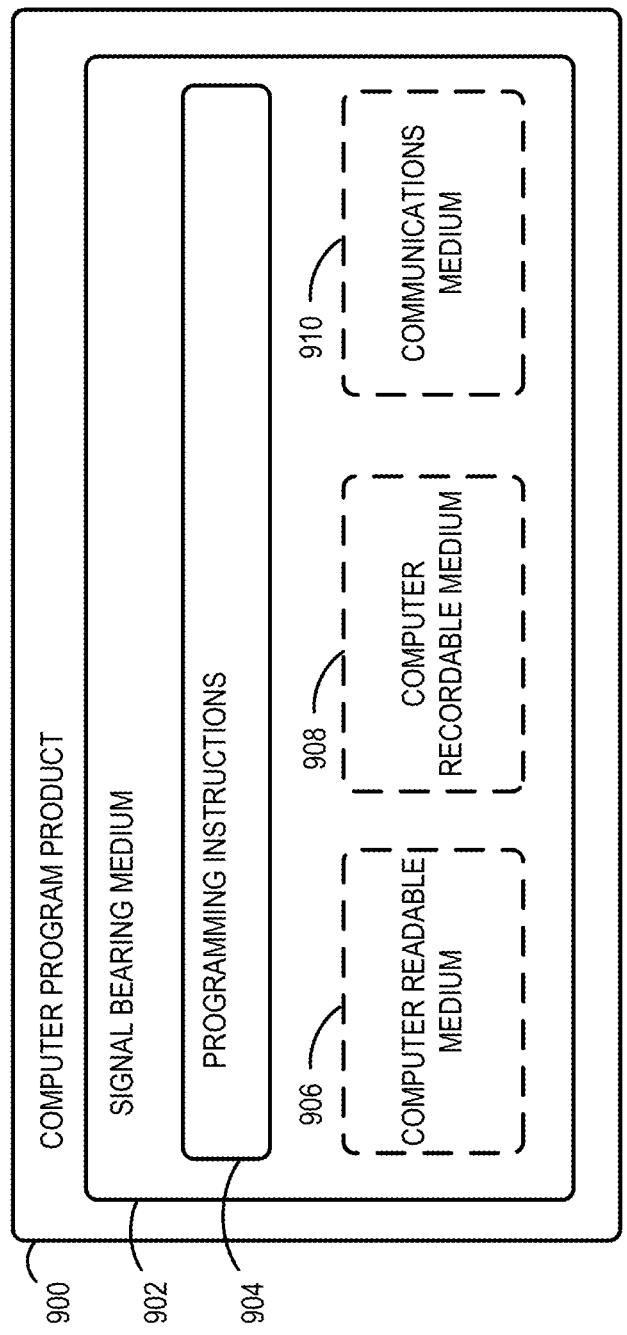
FIG. 9 is a schematic illustrating a conceptual partial view of a computer program for executing a computer process on a computing system, arranged according to one or more example embodiments.

FIG. 9 is a schematic illustrating a conceptual partial view of a computer program for executing a computer process on a computing system, arranged according to at least some embodiments presented herein. In some embodiments, the disclosed methods may be implemented as computer program instructions encoded on a non-transitory computer-readable storage media in a machine-readable format, or on other non-transitory media or articles of manufacture.

In one embodiment, example computer program product 900 is provided using signal bearing medium 902, which may include one or more programming instructions 904 that, when executed by one or more processors may provide functionality or portions of the functionality described above with respect to FIGS. 1-8. In some examples, the signal bearing medium 902 may encompass a non-transitory computer readable medium 906, such as, but not limited to, a hard disk drive, a Compact Disc (CD), a Digital Video Disk (DVD), a digital tape, memory, etc. In some implementations, the signal bearing medium 902 may encompass a computer recordable medium 908, such as, but not limited to, memory, read/write (R/W) CDs, R/W DVDs, etc. In some implementations, the signal bearing medium 902 may encompass a communications medium 910, such as, but not limited to, a digital and/or an analog communication medium (e.g., a fiber optic cable, a waveguide, a wired communications link, a wireless communication link, etc.). Thus, for example, the signal bearing medium 902 may be conveyed by a wireless form of the communications medium 910.

The one or more programming instructions 904 may be, for example, computer executable and/or logic implemented instructions. In some examples, a computing device such as the computer system 100 of FIG. 1 may be configured to provide various operations, functions, or actions in response to the programming instructions 904 conveyed to the computer system 100 by one or more of the computer readable medium 906, the computer recordable medium 908, and/or the communications medium 910.

The non-transitory computer readable medium could also be distributed among multiple data storage elements, which could be remotely located from each other. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

What is claimed is:

1. A method comprising:
   obtaining, using a camera system and a light stage having a plurality of lights, a plurality of images that depict a subject from a plurality of viewpoints and under a plurality of lighting conditions;
   obtaining, using a plurality of infrared cameras, depth data corresponding to the subject;
   based on the depth data corresponding to the subject, extracting, using a neural network, a plurality of features of the subject from the plurality of images;
   pooling, using the neural network, the plurality of features of the subject into a texture space;
   reprojecting the pooled features into an image space;
   providing the pooled features reprojected into the image space with one or more graphical buffers as inputs to a neural renderer; and
   generating, using the neural renderer, an output image depicting the subject from a target view such that illumination of the subject in the output image aligns with the target view.

2. The method of claim 1, wherein obtaining the plurality of images that depict the subject comprises:
   capturing, using the camera system and the light stage, a plurality of image pairs depicting the subject under spherical gradient illumination conditions such that each image pair includes a gradient image and an inverse gradient image.

3. The method of claim 2, wherein obtaining the plurality of images that depict the subject further comprises:
   capturing, using the camera system and the light stage, a series of images that depict the subject under one-light-at-a-time conditions such that each image from the series of images depicts the subject under illumination from a single light from the plurality of lights.

4. The method of claim 1, further comprising:
   estimating a coarse geometry for the subject based on the depth data; and wherein extracting the plurality of features of the subject from the plurality of images comprises:
extracting a feature from each image based on the coarse geometry estimated for the subject.

5. The method of claim 4, wherein extracting the feature from each image based on the coarse geometry estimated for the subject comprises:
using a convolution neural network to extract the feature from each image.

6. The method of claim 1, further comprising:
transforming, using a convolution neural network, the pooled features to extract implicit reflectance and local geometry information.

7. The method of claim 1, wherein the one or more graphical buffers includes at least one of a light map and a reflection map determined based on the implicit reflectance and local geometry information.

8. The method of claim 7, wherein generating, using the neural renderer, the output image depicting the subject from the target view such that illumination of the subject in the output image aligns with the target view comprises:
causing the neural renderer to use the pooled features reprojected into the image space with the one or more graphical buffers to generate the output image depicting the subject from the target view.

9. The method of claim 8, wherein generating, using the neural renderer, the output image depicting the subject from the target view such that illumination of the subject in the output image aligns with the target view comprises:
generating the output image depicting the subject in an arbitrary environment.

10. The method of claim 1, wherein generating, using the neural renderer, the output image depicting the subject from the target view such that illumination of the subject in the output image aligns with the target view further comprises:
generating a series of images depicting the subject from a plurality of views such that illumination of the subject in each image aligns with a particular view associated with the image.

11. The method of claim 1, further comprising:
determining a plurality warp fields configured to map pixels from an image to the texture space, wherein each warp field is determined using the depth data corresponding to the subject.

12. The method of claim 1, wherein
the pooled features encode both local and global geometric properties and four dimensional (4D) reflectance.

13. A system comprising:
a camera system having a plurality of infrared cameras;
a light stage having a plurality of lights; and
a computing device configured to:
obtain, using the camera system and the light stage having the plurality of lights, a plurality of images that depict a subject from a plurality of viewpoints and under a plurality of lighting conditions;
obtain, using the plurality of infrared cameras, depth data corresponding to the subject;
based on the depth data corresponding to the subject, extract, using a neural network, a plurality of features of the subject from the plurality of images;

pool, using the neural network, the plurality of features of the subject into a texture space;
reproject the pooled features into an image space;
provide the pooled features reprojected into the image space with one or more graphical buffers as inputs to a neural renderer; and
generate, using the neural renderer, an output image depicting the subject from a target view such that illumination of the subject in the output image aligns with the target view.

14. The system of claim 13, wherein the computing device is further configured to:
transform, using a convolution neural network, the pooled features to extract implicit reflectance and local geometry information.

15. The system of claim 13,
wherein the one or more graphical buffers includes at least one of a light map and a reflection map determined based on the depth data corresponding to the subject.

16. The system of claim 15, wherein the computing device is further configured to:
cause the neural renderer to use the pooled features reprojected into the image space with the one or more graphical buffers to generate the output image depicting the subject from the target view.

17. The system of claim 13, wherein the neural network is a convolution neural network.

18. The system of claim 13, wherein the computing device is further configured to:
display the output image on a display interface.

19. The system of claim 18, wherein the computing device is further configured to:
receive an input specifying a second target view; and
responsive to the input, generate a second output image depicting the subject from the second target view such that illumination of the subject in the second output image aligns with the second target view.

20. A non-transitory computer-readable medium configured to store instructions, that when executed by a computing system comprising one or more processors, causes the computing system to perform operations comprising:
obtaining, using a camera system and a light stage having a plurality of lights, a plurality of images that depict a subject from a plurality of viewpoints and under a plurality of lighting conditions;
obtaining, using a plurality of infrared cameras, depth data corresponding to the subject;
based on the depth data corresponding to the subject, extracting, using a neural network, a plurality of features of the subject from the plurality of images;
pooling, using the neural network, the plurality of features of the subject into a texture space;
reprojecting the pooled features into an image space;
providing the pooled features reprojected into the image space with one or more graphical buffers as inputs to a neural renderer; and
generating, using the neural renderer, an output image depicting the subject from a target view such that illumination of the subject in the output image aligns with the target view.

* * * * *